United States Patent
Bosselmann et al.

(10) Patent No.: US 7,881,567 B2
(45) Date of Patent: Feb. 1, 2011

(54) OPTICAL DEVICE FOR MONITORING A ROTATABLE SHAFT WITH AN ORIENTED AXIS

(75) Inventors: Thomas Bosselmann, Marloffstein (DE); Michael Willsch, Jena (DE)

(73) Assignee: Siemens Aktiengesellschaft, Munich (DE)

( * ) Notice: Subject to any disclaimer, the term of this patent is extended or adjusted under 35 U.S.C. 154(b) by 146 days.

(21) Appl. No.: 12/310,725

(22) PCT Filed: Aug. 23, 2007

(86) PCT No.: PCT/EP2007/058750
§ 371 (c)(1),
(2), (4) Date: Mar. 5, 2009

(87) PCT Pub. No.: WO2008/028813
PCT Pub. Date: Mar. 13, 2008

(65) Prior Publication Data
US 2010/0014072 A1     Jan. 21, 2010

(30) Foreign Application Priority Data
Sep. 6, 2006   (DE) ................ 10 2006 041 865

(51) Int. Cl.
*G02B 6/00*   (2006.01)
(52) U.S. Cl. .............. 385/13; 385/12; 385/88; 385/94; 385/123
(58) Field of Classification Search ........ 385/12, 385/13, 88, 94, 123
See application file for complete search history.

(56) References Cited

U.S. PATENT DOCUMENTS 5,930,280 A    7/1999   Rossi et al.

(Continued)

FOREIGN PATENT DOCUMENTS

DE    10241428 A1   3/2004

(Continued)

OTHER PUBLICATIONS

Pieter L. Swart et al., "Dual Bragg grating sensor for concurrent torsion and temperature measurement", Measurement Science and Technology, IOP, Bristol, GB, May 1, 2006, vol. 17 Nr. 5, pp. 1057-1064, XP020103493, ISSN: 09570233.

(Continued)

*Primary Examiner*—Jennifer Doan

(57) ABSTRACT

An optical device for monitoring a rotatable shaft is disclosed. The optical device has an optical waveguide arranged on the rotatable shaft and an optical sensor. The optical device further has a transmitting unit transmit the light signal, a transfer device to transmit the light signal between the transmitting unit and the optical waveguide and an evaluation unit for determining a physical variable from a light signal coming from the optical sensor and transferred by the transfer device, the evaluation unit being associated with the transmitting unit. The transfer device has an optical 'multimode' waveguide associated with a coupling device, the waveguide being associated with the transmitting unit and a further optical 'multimode' waveguide, with an associated coupling device associated with the optical waveguide and arranged on the rotatable shaft eccentrically to its axis.

13 Claims, 5 Drawing Sheets

U.S. PATENT DOCUMENTS

| | | | |
|---|---|---|---|
| 5,999,682 A * | 12/1999 | Vincent et al. | 385/134 |
| 6,004,639 A | 12/1999 | Quigley et al. | |
| 6,430,340 B1 * | 8/2002 | Iida et al. | 385/33 |
| 6,923,048 B2 | 8/2005 | Willsch et al. | |
| 7,772,940 B2 * | 8/2010 | Mahon et al. | 333/21 A |
| 2004/0184700 A1 | 9/2004 | Li et al. | |
| 2005/0061058 A1 | 3/2005 | Willsch et al. | |
| 2005/0253051 A1 | 11/2005 | Hwang et al. | |

FOREIGN PATENT DOCUMENTS

WO  WO 2005/111537 A1  11/2005

OTHER PUBLICATIONS

P. Chanclou et al., Optics Communications 233, "Design and demonstration of a multicore single-mode fiber coupled lens device", 2004, pp. 333-339, Elsevier; Book.

* cited by examiner

US 7,881,567 B2

OPTICAL DEVICE FOR MONITORING A ROTATABLE SHAFT WITH AN ORIENTED AXIS

CROSS REFERENCE TO RELATED APPLICATIONS

This application is the US National Stage of International Application No. PCT/EP2007/058750 filed Aug. 23, 2007 and claims the benefit thereof. The International Application claims the benefits of German Patent application No. 10 2006 041 865.4 DE filed Sep. 6, 2006, both of the applications are incorporated by reference herein in their entirety.

FIELD OF INVENTION

The invention relates to an optical device for monitoring a rotatable shaft with an oriented axis.

BACKGROUND OF INVENTION

The measurement of temperatures and expansions on rotatable parts, such as drive shafts and generator shafts for example, is becoming increasingly important since, as a result of ever higher power demands, these parts will be operated right up the their load limits. As a rule conventional electrical temperature sensors, such as thermoelements for example, and electrical expansion sensors, such as piezoelectric sensors for example, are used for this purpose. In such cases the sensor signals must be conditioned to the shaft. This is normally done with special measurement amplifiers. Radio transmission or IR transmission is then used to send the measuring signals conditioned using this method from the shaft to a transceiver unit located in a fixed position in relation to the shaft. For this purpose auxiliary energy must be provided on the shaft in each case to enable the electronic components arranged there to be driven. This can be done for example through a battery or also through an inductive transmitter. Overall a large outlay is involved here. Since enormously high centrifugal forces can arise with shafts rotating at high speed, the corresponding electronic components must be adapted to these extreme conditions. The electronic components are usually encapsulated.

Instead of electrical sensors, the use of optical sensors based on optical waveguides, such as FBG (FBG: Fiber-Bragg-Grating) sensors, is known for these types of measurements on parts turning at high speeds. In such cases the actions of coupling and decoupling an optical transceiver unit arranged in a fixed location to and from the rotating shaft have proved especially difficult. For example optical transmitters arranged axially on a face side of the rotating shaft are especially suitable for this purpose, employing two collimators to transmit light signals between a transceiver unit arranged in a fixed position relative to the shaft and an optical waveguide arranged on the rotating shaft. In such cases the two collimators are arranged in a common housing which is embodied with one non-rotating and one rotating part. Such an optical transmitter is however not suitable for measurements on shafts for which there is no access to the end face side.

SUMMARY OF INVENTION

An object of the invention is to specify an optical device for monitoring a rotatable shaft which is robust and is able to have universal application all along the shaft.

This object is achieved in accordance with the invention by an optical device as claimed in the claims.

The inventive optical device involves an optical device for monitoring a rotatable shaft with an oriented axis, comprising
at least one optical waveguide arranged on the rotatable shaft provided with at least one optical sensor, via which the at least one optical sensor is able to be interrogated by means of a light signal,
a transceiver unit mounted at a fixed location in relation to the rotatable shaft, with which the light signal is able to be emitted,
transmission means, with which the light signal is able to be transmitted between the fixed transceiver unit and the optical waveguide arranged on the rotatable shaft, and
an evaluation unit assigned to the transceiver unit for determining a physical variable from a light signal originating from at least one optical sensor and transmitted by the transmission means, with the transmission means having
at least one multimode optical waveguide with assigned coupling means arranged at a fixed location in relation to the rotatable shaft and assigned to the transceiver unit and
at least one further multimode optical waveguide with assigned coupling means arranged on the rotatable shaft eccentric to its axis connected to the at least one optical waveguide and
the light signals being able to be transmitted via the coupling element between the multimode optical waveguides.

The eccentric mounting of the further multimode waveguide and of the assigned coupling means on the rotatable shaft means that the transmission of the light signal between the coupling means arranged on the shaft and the coupling means arranged at a fixed location is only possible via a free beam coupling. In such cases the light signals can only be coupled over between the coupling means in a small time window during a rotation of the shaft. Since the transmission means has multimode optical waveguides there is a guarantee of hardly any coupling losses occurring on transmission of the light signal between the coupling means. The fact that the coupling path, i.e. the path between the two coupling means, is covered twice during a measurement would result in high losses for example, were single optical waveguides to be used instead of the multimode optical waveguides, making reliable measurement almost impossible. In addition a free beam coupling of "multimode optical waveguides by comparison with single optical waveguides demands less adjustment and is less sensitive to adjustment errors. The physical variable to be determined is especially the temperature and/or the expansion of the shaft.

Further advantageous embodiments of the optical device in accordance with the invention are claimed in the dependent claims.

It is thus advantageous for the at least one optical sensor to be at least an FBG sensor and for the at least one optical waveguide to be at least a single mode optical waveguide. An FBG sensor allows an almost punctate, i.e. a locally very narrowly restricted temperature and/or expansion measurement on the shaft. By contrast an optical sensor according to the Brillouin or Raman principle which can also be used normally has a certain local integrating effect, which can extend over several meters for example. A point measurement, i.e. especially a local restriction of the detection point to a few millimeters, can hardly be obtained with these types of optical sensor. It is easily possible with an FBG sensor however. In such cases a specific proportion of the supplied light signal is reflected back by the respective Bragg wavelength (focus wavelength) in the FBG sensor. The Bragg wavelength changes with the influencing variable predominating in the type of measurement, here especially the temperature and/or the expansion of the shaft at the location of the FBG sensor. This change in the wavelength content (or wavelength spectrum) of the respective (part) light signal reflected back can be used as a measure for the influencing variable (temperature and/or expansion) to be detected. To interrogate the FBG sensor by means of the light signal a wideband light source, such as an LED with a bandwidth of around 45 nm, an SLD with a bandwidth of around 20 nm or a tunable laser with a bandwidth of around 100 nm for example is used in particular.

Advantageously in such cases a number of FBG sensors are provided at different end points along the at least one single-mode optical waveguide. It is also useful for the at least one multimode optical waveguide arranged on the rotatable shaft to be connected to a number of single-mode optical waveguides. On the one hand this allows a locally-resolved temperature and/or expansion distribution and on the other with point-type events, such as for example a sudden locally-restricted increase in temperature and/or expansion, the precise pinpointing of the event location. The resolution in such cases will merely be determined by the spacing of the individual FBG sensors from each other.

It is of advantage for the FBG sensors to have different Bragg wavelengths from each other. If for example with the optical device the so called wavelength multiplex method is employed, as a rule up to 10 FBG sensors can be arranged one after another in a waveguide. The light signal injected by the transceiver unit into the multimode optical waveguide must have a wavelength range for this which covers all Bragg wavelengths. If on the other hand, as an alternative to the wavelength multiplex method the so-called time division multiplexing method (OTDR: Optical Frequency Domain Reflectometry) is used, an almost unlimited number of FBG sensors can be arranged in an optical waveguide. In such cases the sensors can also be spatially different for identical Bragg wavelengths.

Expediently the light signal wavelength emitted by the transceiver unit features wavelengths from the visible wavelength range, i.e. from 380 nm to 780 nm, and/or the near infrared wavelength range (NIR), i.e. from 780 nm to 2500 nm.

It is expedient for the light signal able to be emitted by the transceiver unit to be at least one light pulse. Advantageously the emission of the light signal is triggered with the rotation of the shaft. Thus light signals are only emitted and received again as required. The transceiver unit operates with greater energy efficiency in this case and simultaneously has a longer service life.

Advantageously the evaluation unit features an optical mass spectrometer with a least one CCD row. It is however also expedient for the evaluation unit to feature at least one complementary edge filter with at least one photodetector. This embodiment of such an evaluation unit is cheaper to implement compared to the first embodiment mentioned above.

BRIEF DESCRIPTION OF THE DRAWINGS

Preferred, but in no way restrictive exemplary embodiments of the method and of the arrangement will now be explained in greater detail with reference to the drawing. For the purposes of illustration the drawing is not drawn to scale and certain features are depicted schematically. The individual diagrams show FIG. 1 an optical device for monitoring a rotatable shaft by means of optical sensors in a single-mode optical waveguide, FIG. 2 an optical device for monitoring the rotatable shaft by means of optical sensors in a number of single-mode optical waveguides, FIG. 3 a cross-section through the contact surface of a multimode optical waveguide and a number of single-mode optical waveguides, FIG. 4 a cross-section through the contact surface of the multimode optical waveguide and a number of single-mode optical waveguides with an increased external diameter compared to FIG. 3, FIG. 5 an optical device for monitoring a rotatable shaft with radially oriented coupling path and a serpentine arrangement of single-mode optical waveguides, FIG. 6 an optical device for monitoring a rotatable shaft with means arranged on the shaft for diverting the coupling path and FIG. 7 an optical device for monitoring a rotatable shaft with a fixed means for diverting the coupling path.

DETAILED DESCRIPTION OF INVENTION

Parts which correspond to one another are provided with the same reference symbols in FIGS. 1 to 7.

Figure 1:
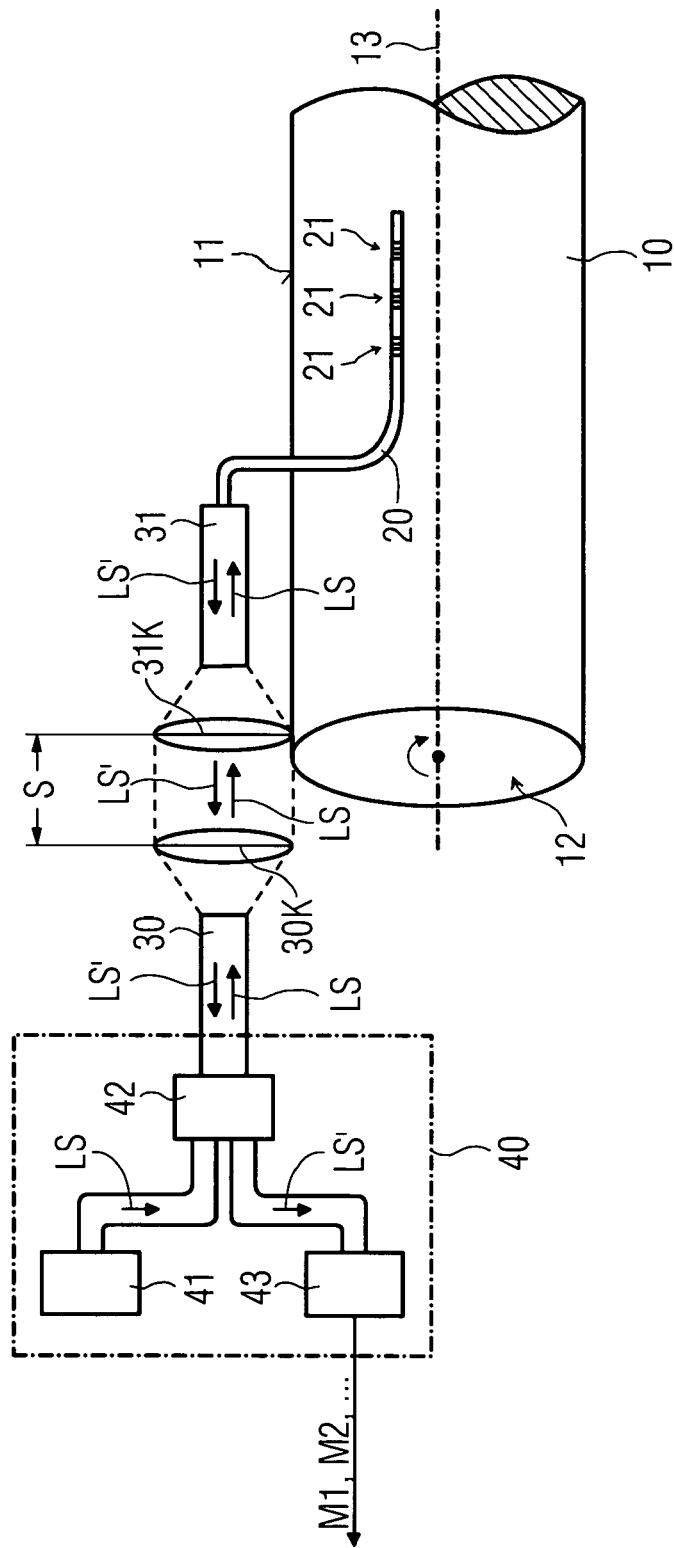

FIG. 1 shows an optical device for monitoring a shaft 10, especially a shaft connected to a machine or a generator and supported to allow it to rotate. The shaft 10 is able to be rotated around its oriented axis 13 here. The end face side of the shaft 10 is labeled 12. Arranged on and/or in the outer surface 11 of shaft 10 is an optical waveguide 20 with optical sensors 21 for detecting temperature and/or expansion of the shaft 10. As shown in FIG. 1, the sensors 21 are FBG sensors incorporated into single-mode optical waveguides 20. With a number of FBG sensors 21 each individual sensor 21 can feature a specific focal point wavelength the so-called Bragg wavelength which differs especially from those of the other sensors 21. The FBG sensors 21 are interrogated by a light signal LS which is created by a wideband light source 41, especially an SLD (Super Luminescence Diode). The light source 41 in this cases is part of a transceiver unit 40 arranged in a fixed location. Created by the fixed transceiver unit 40 the light signal LS will be injected via a transmission means into the single-mode optical waveguide provided with the FBG sensors 21. In each FBG sensor 21 a proportion of the injected light signal LS is reflected back with the respective Bragg wavelength as a part reflex light signal. The remaining proportion of the light signal LS on the other hand passes the relevant FBG sensor 21 and if necessary hits the next FBG sensor. A light signal LS' reflected from the FBG sensor 21 is then present at the transceiver unit 40 which is made up of the part reflex light signal of the individual FBG sensors 21.

The light signal LS' coming from the FBG sensors 21 injected back into the transceiver unit 40 is directed by an optical bus coupler 42 to an evaluation unit 43. This especially includes an optoelectrical converter, an analog/digital converter and a digital signal processor (not shown in the figures). The optical converter advantageously features a spectrally-selective element for selection of the individual part-reflex signals, for example the shape of a spectrometer with at least one CCD row. As an alternative to this, the optoelectrical converter can feature at least one complementary edge filter with at least one photodetector. Downstream from the opto-electronic conversion an analog/digital conversion is undertaken in the analog/digital converter. The digitized output signal of the analog/digital converter is fed to the digital signal processor, by means of which measured values M1, M2, ... are determined for the reference temperatures and/or expansions detected in the FBG sensors 21.

The light source 41, the optical bus coupler 42 and the evaluation unit 43 are grouped together in the transceiver unit 40. These subunits or parts thereof can however also be constructionally separated from one another, i.e. not embodied as a common transceiver unit 40. In addition a purely analog evaluation, for example by means of a hard-wired electronic circuit, is possible. No analog/digital converter would then be present and the evaluation unit 43 would be implemented in analog technology.

The transmission means is used for transmission of the light signals LS and LS' emitted by the transceiver unit 40 and received back again between fixed transceiver unit 40 and single-mode optical waveguide 20 turning with the shaft 10. The transmission means thus consists of a fixed part assigned to the transceiver unit 40 and a part arranged on the rotatable shaft 10. The fixed part comprises a multi-mode optical waveguide 30 connected to the transceiver unit 40 with a first coupling means 30K, especially a collimator. On the other hand the part of the transmitter arranged on the rotatable shaft 10 comprises a multimode optical waveguide 31 connected to the single-mode optical waveguide 20 with a second coupling means 31K facing towards the first coupling means 30K which is especially likewise a collimator. The connection between multimode optical waveguide 31 and single-mode optical waveguide 20 is made via facing sides of the two fibers 20 and 21.

The light signal LS emitted by the transceiver unit 40 thus reaches the first coupling element 30K via the first multimode fiber 30 which transmits the light signal LS preferably collimated to the second coupling means 31K almost loss-free if the two coupling means 30K, 31K are facing each other. The distance covered between the two coupling means is labeled S. The light signal LS travels via the second coupling means 31K through the second multimode optical waveguide 31 into single mode optical waveguide 20, in which the FBG sensors 21 are able to be interrogated by means of the light signal LS. The light signal LS' reflected back from the FBG sensors 21 then returns on the reverse path for evaluation in the transceiver unit 40.

Advantageously the transceiver unit 40 and thereby also the light source 41 and if necessary the evaluation unit 43 are operated in pulsed mode, so that the light signal LS is emitted in the form of light pulses. The light pulses are advantageously emitted synchronously with the revolutions of the shaft, so that light pulses are only emitted in the time window, in which the two coupling means 30K, 31K are opposite each other in a position suitable for transmission. In such cases the transceiver unit 40 can be operated in a triggered fashion for example by a means for determining the speed of rotation of the shaft 10.

Figure 2:
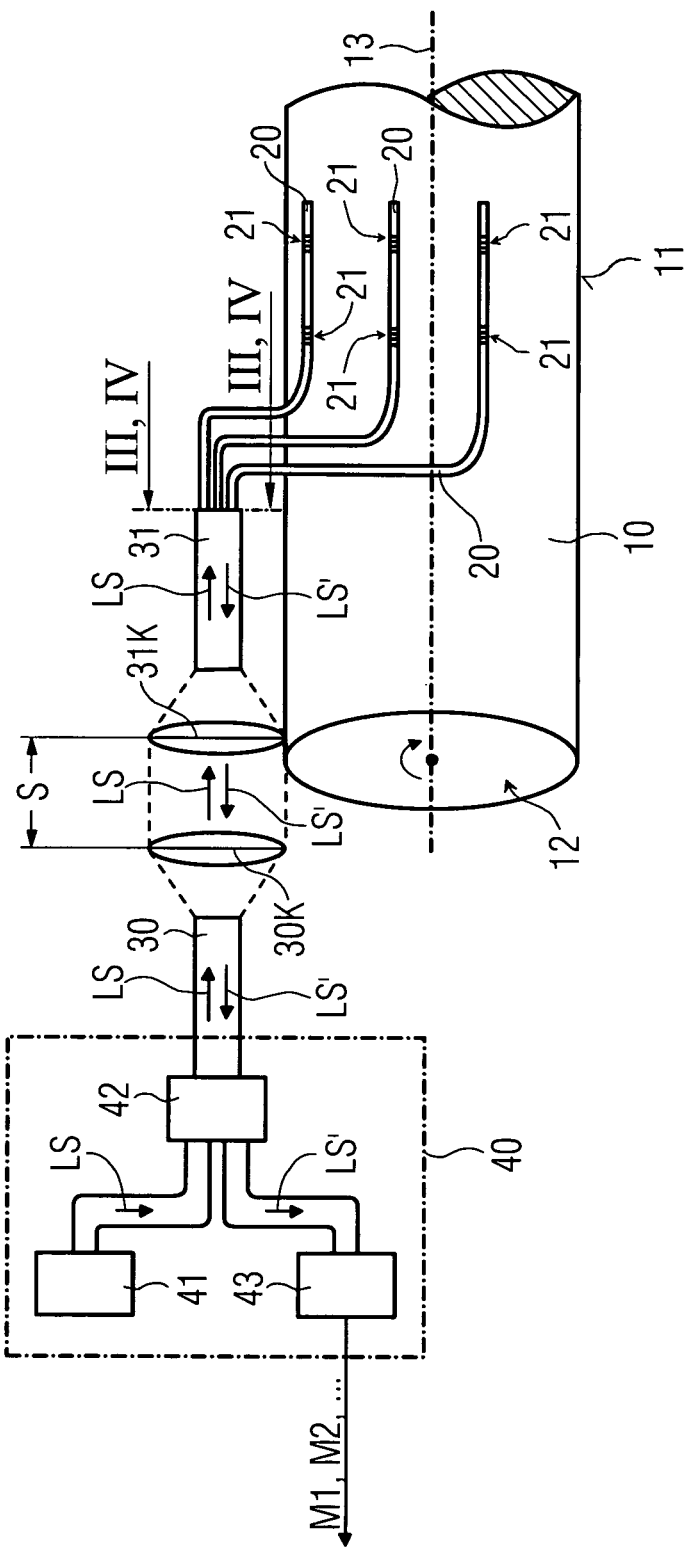

The exemplary embodiment of the optical device shown in FIG. 2 differs from that shown in FIG. 1 merely in that a number (in this case three) single-mode fibers 20 are connected to the multimode fiber 31. Thus a (surface) covering sensor arrangement is implemented so that the temperature and/or the expansion of the shaft 10 can be determined with local resolution.

Figure 3:
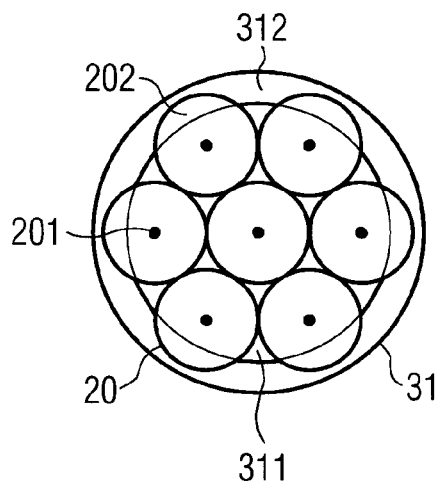

FIG. 3 depicts the cross-section for the sectional line III shown in FIG. 2. The cross-section in this case runs through the face-side contact surface of the multimode optical waveguide 31 and single-mode optical waveguide 20. The seven single-mode optical waveguides 20 are grouped into a bundle in this case such that their cross-sections are arranged into a tightest package. The outer area of the multimode optical waveguide 31 represents the waveguide shroud 312 surrounding the optical waveguide core 311. Similarly the single-mode optical waveguides 20 are also embodied with a waveguide shroud 202 and a waveguide core 201. It should be pointed out that the waveguide core 201 to waveguide shroud 202 ratio is significantly smaller for a single-mode optical waveguide 20 than the ratio of waveguide core 311 to waveguide shroud 312 for multimode optical waveguides. So that the light signal LS, LS' can be transmitted between the multimode optical waveguide 31 and the single-mode optical waveguide 20, the waveguide cores 201 of the single-mode optical waveguide 20 must lie within the waveguide core 311 of the multimode optical waveguide 31. With the arrangement depicted in FIG. 3 the starting point used for the example is a core diameter of the multimode optical waveguide 31 of 200 μm and an external diameter of the individual single-mode optical waveguides 20 of 80 μm. The core diameter of an individual single-mode optical waveguide 20 generally amounts to appr. 5 μm.

Figure 4:
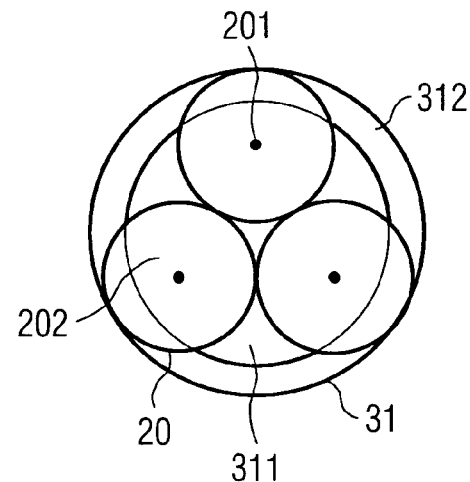

In FIG. 4, as in FIG. 3 the cross-section for the section line IV shown in FIG. 2 is depicted. Here the external diameter of the single-mode optical waveguide 20 is however greater than selected, so that in this example only three single-mode optical waveguides 20 can be connected to the multimode optical waveguide 31. For example in this case the single-mode optical waveguides 20 respectively have an external diameter of 125 μm for a core diameter of the multimode optical waveguide 31 of 200 μm.

Figure 5:
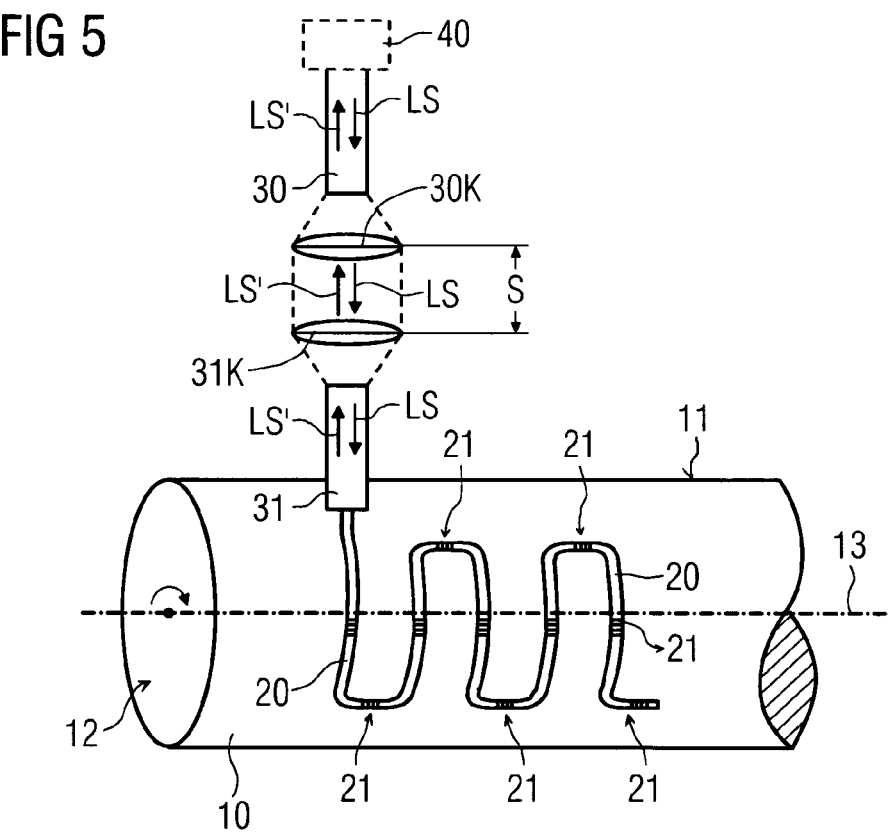

While in FIG. 1 and in FIG. 2 the coupling path S is always oriented axially i.e. in parallel to axis 13, FIG. 5 shows an exemplary embodiment in which the coupling path S is oriented radially, i.e. perpendicular to the axis 13. As in FIG. 1, only one single-mode optical waveguide 20 is connected to the multimode optical waveguide 31. The single-mode optical waveguide 20 with its plurality of FBG sensors 21 is in this case arranged in a serpentine form on and/or in the outer surface 11 of the shaft 10. Such an arrangement also makes a "full-coverage" monitoring of the shaft 10 possible. Naturally, like FIG. 2, a number of such single-mode optical waveguides 20 laid in a serpentine shape can be connected to the multimode optical waveguide 31.

Figure 6:
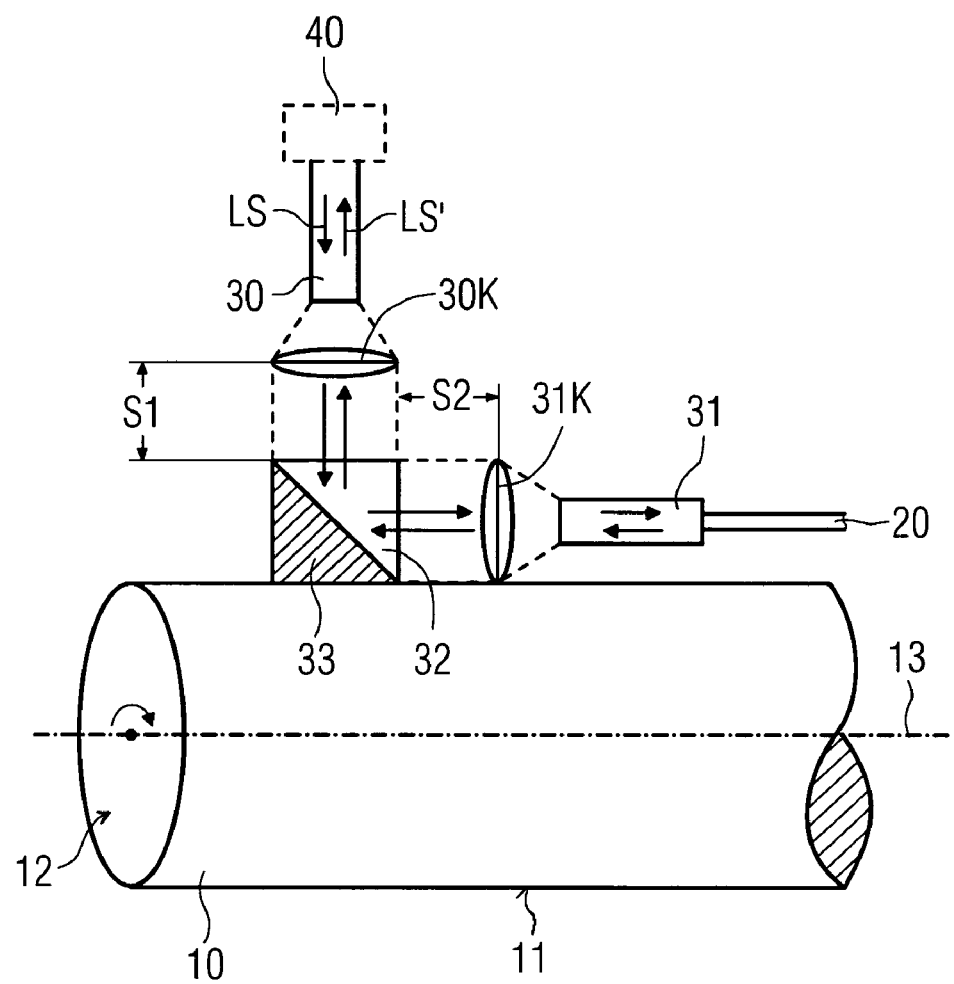
Figure 7:
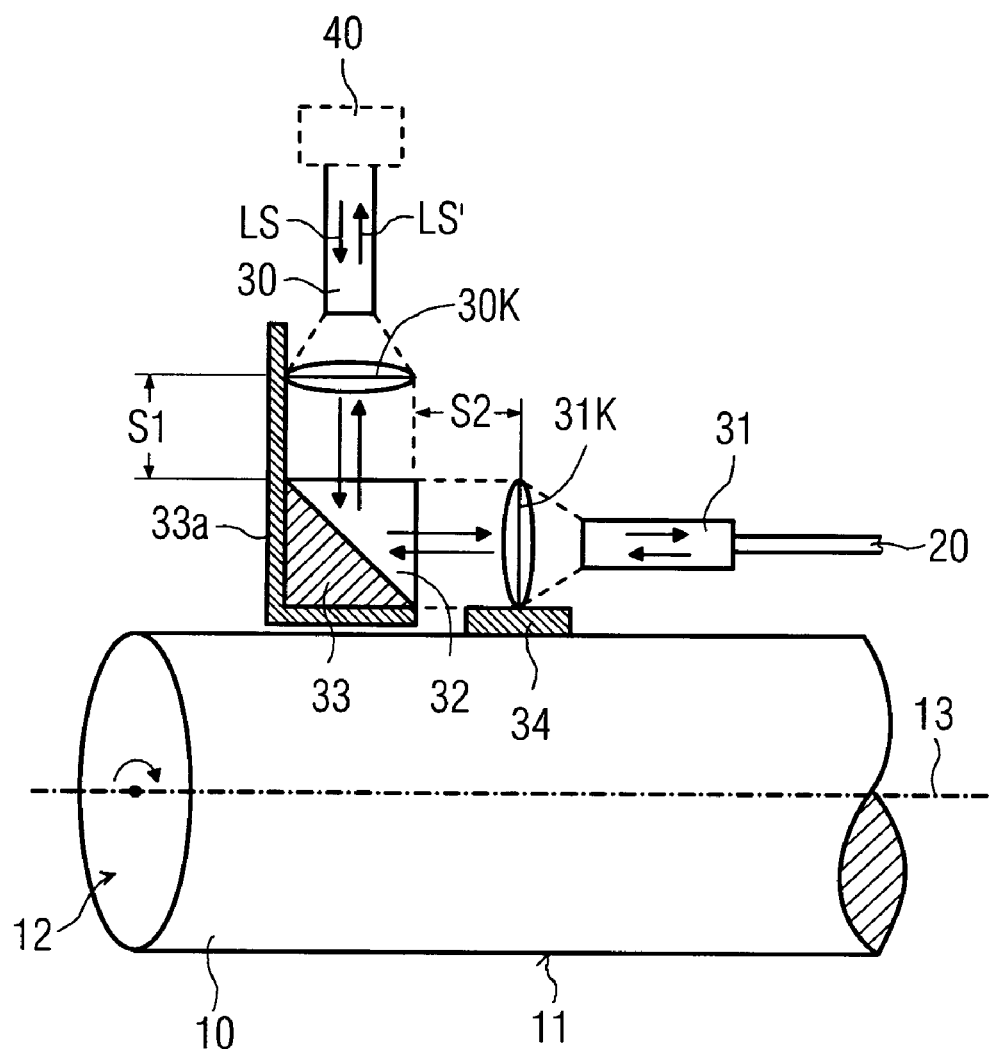

FIG. 6 and FIG. 7 respectively each depict a coupling path S consisting of a part S1 running radially and a part S2 running axially. The light signals LS and LS' in this case are diverted by a reflection means 32, especially a diversion prism, preferably by 90°. This means that the respective reflection means 32 in both exemplary embodiments is a part of the transmission means. The respective reflection means 32 is attached for mounting to a holder 33, 33a provided for it.

In FIG. 6 the holder 33 is attached to the shaft 10 close to the second coupling means 31K. The holder 33a in accordance with FIG. 7 is arranged instead at a fixed location relative to the rotatable shaft 10. The holder 33a can also be provided for fixing the first coupling means 30K, as depicted in FIG. 7. To avoid contact between the holder 33a and the shaft 10, the second coupling means 31K is attached to a base 32 for example.

The invention claimed is:

1. An optical device for monitoring a rotatable shaft with an oriented axis, comprising:
   an optical waveguide having an optical sensor arranged on the rotatable shaft, the optical sensor being interrogated via the optical waveguide by a light signal;
   a transceiver unit arranged in a fixed location relative to the rotatable shaft, the light signal being emitted by the transceiver unit;
   a transmission unit, the light signal being transmitted between the transceiver unit and the optical waveguide by the transmission unit, the transmission unit having a first multimode optical waveguide arranged at a fixed location in relation to the rotatable shaft and assigned to the transceiver unit with an assigned first coupling device and a second multimode optical waveguide arranged on the rotatable shaft eccentric to an axis of the rotatable shaft and connected to the optical waveguide with an assigned second coupling device; and an evaluation unit assigned to the transceiver unit for determining a physical variable from a light signal originating from the optical sensor and transmitted by the transmission unit, wherein the light signal is transmitted via the first and second coupling devices between the first and second multimode optical waveguides.

2. The optical device as claimed in claim 1, wherein the optical sensor is at least a Fiber-Bragg-Grate sensor and the optical waveguide is at least a single-mode optical waveguide.

3. The optical device as claimed in claim 2, wherein a plurality of Fiber-Bragg-Grate sensors are placed at different points along the at least one single-mode optical waveguide.

4. The optical device as claimed in claim 2, wherein the first multimode optical waveguide arranged on the rotatable shaft is connected to a plurality of individual single-mode optical waveguides.

5. The optical device as claimed in claim 3, wherein the first multimode optical waveguide arranged on the rotatable shaft is connected to a plurality of individual single-mode optical waveguides.

6. The optical device as claimed in claim 2, wherein the Fiber-Bragg-Grate sensors have different Bragg wavelengths from each other.

7. The optical device as claimed in claim 3, wherein the Fiber-Bragg-Grate sensors have different Bragg wavelengths from each other.

8. The optical device as claimed in claim 1, wherein the light signal emitted by the transceiver unit has wavelengths of the visible wavelength range.

9. The optical device as claimed in claim 1, wherein the light signal emitted by the transceiver unit has wavelengths near infrared wavelength range.

10. The optical device as claimed in claim 1, wherein the light signal emitted by the transceiver unit has wavelengths of the visible wavelength range and near infrared wavelength range.

11. The optical device as claimed in claim 1, wherein the light signal emitted by the transceiver unit is at least one light pulse.

12. The optical device as claimed in claim 1, wherein the evaluation unit features an optical mass spectrometer with at least one CCD row.

13. The optical device as claimed in claim 1, wherein the evaluation unit features at least one complementary edge filter with at least one photodetector.

* * * * *